US012097735B2

(12) United States Patent
Gerlach et al.

(10) Patent No.: US 12,097,735 B2
(45) Date of Patent: Sep. 24, 2024

(54) SUSPENSION SYSTEM WITH DYNAMIC WEIGHT BALANCING CONTROL

(71) Applicant: Ford Global Technologies, LLC, Dearborn, MI (US)

(72) Inventors: Matthew Jenkin Gerlach, Bannockburn (AU); Jason Wallace Michener, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 182 days.

(21) Appl. No.: 17/743,966

(22) Filed: May 13, 2022

(65) Prior Publication Data

US 2023/0364958 A1 Nov. 16, 2023

(51) Int. Cl.
*B60G 17/016* (2006.01)
*B60G 17/06* (2006.01)

(52) U.S. Cl.
CPC ..... *B60G 17/0162* (2013.01); *B60G 17/0164* (2013.01); *B60G 17/06* (2013.01); *B60G 2204/8102* (2013.01); *B60G 2400/00* (2013.01); *B60G 2400/05* (2013.01); *B60G 2400/0523* (2013.01); *B60G 2400/10* (2013.01); *B60G 2400/104* (2013.01); *B60G 2400/106* (2013.01); *B60G 2400/208* (2013.01); *B60G 2400/252* (2013.01); *B60G 2400/40* (2013.01); *B60G 2500/104* (2013.01); *B60G 2600/182* (2013.01); *B60G 2800/18* (2013.01); *B60G 2800/24* (2013.01)

(58) Field of Classification Search
None
See application file for complete search history.

(56) References Cited

U.S. PATENT DOCUMENTS 5,852,787 A * 12/1998 Fodor ............... B60G 17/0162
280/124.1
5,944,153 A * 8/1999 Ichimaru ............. B60G 17/015
280/5.515
(Continued)

FOREIGN PATENT DOCUMENTS

AU 2015328248 A1 * 5/2017 ........... B60G 17/016
CA 2890996 A1 * 5/2014 ........... B60G 17/016
(Continued)

*Primary Examiner* — Kevin R Steckbauer
(74) *Attorney, Agent, or Firm* — Burr & Forman LLP; Lorne Forsythe

(57) ABSTRACT

A method of automatically applying damping force interventions for dynamic weight balancing in a suspension system of a vehicle may include receiving ride height information associated with respective individual wheels of the vehicle and vehicle attitude information from vehicle sensors, determining, based on the ride height information and the vehicle attitude information, whether a trigger event has occurred, and generating a first damping intervention signal to change a damping force applied by a first selected adjustable damper responsive to determining that the trigger event has occurred. The first selected damper may be one of a plurality of adjustable dampers associated with respective ones of the individual wheels of the vehicle. The first selected adjustable damper may be associated with only one of a pair of rear wheels of the vehicle.

14 Claims, 8 Drawing Sheets

(56) References Cited

U.S. PATENT DOCUMENTS

| | | | | |
|---|---|---|---|---|
| 6,148,252 A * | 11/2000 | Iwasaki | B60G 17/0152 | 701/37 |
| 6,290,034 B1 * | 9/2001 | Ichimaru | B60G 17/015 | 280/5.515 |
| 6,370,458 B1 * | 4/2002 | Shal | B60G 17/04 | 180/41 |
| 6,711,482 B2 * | 3/2004 | Shiino | B60G 17/0162 | 701/91 |
| 6,876,909 B2 * | 4/2005 | Kim | B60G 17/0164 | 280/5.513 |
| 8,296,010 B2 * | 10/2012 | Hirao | B60G 17/06 | 280/5.507 |
| 9,205,717 B2 * | 12/2015 | Brady | B60G 17/0165 | |
| 9,452,654 B2 * | 9/2016 | Ericksen | F16F 9/5126 | |
| 9,527,362 B2 * | 12/2016 | Brady | B60G 17/016 | |
| 9,662,954 B2 * | 5/2017 | Brady | B60G 17/016 | |
| 10,005,335 B2 * | 6/2018 | Brady | B60G 17/0162 | |
| 10,040,329 B2 * | 8/2018 | Ericksen | B60G 17/016 | |
| 10,047,817 B2 * | 8/2018 | Ericksen | B60G 17/01908 | |
| 10,336,148 B2 * | 7/2019 | Ericksen | F16F 9/5126 | |
| 10,336,149 B2 * | 7/2019 | Ericksen | F16F 9/5126 | |
| 10,670,106 B2 * | 6/2020 | Ericksen | B60G 17/01908 | |
| 10,800,220 B2 * | 10/2020 | Ericksen | B60G 17/016 | |
| 10,807,433 B2 * | 10/2020 | Ericksen | B60G 17/018 | |
| 10,814,689 B2 * | 10/2020 | Ericksen | B60G 17/018 | |
| 10,821,795 B2 * | 11/2020 | Ericksen | B60G 17/018 | |
| 10,987,987 B2 * | 4/2021 | Graus | B60G 17/0164 | |
| 11,124,036 B2 * | 9/2021 | Brady | B60G 17/019 | |
| 11,173,765 B2 * | 11/2021 | Ericksen | B60G 17/08 | |
| 11,247,561 B2 * | 2/2022 | Gully | B60K 7/0007 | |
| 11,400,784 B2 * | 8/2022 | Brady | B60G 17/08 | |
| 11,400,785 B2 * | 8/2022 | Brady | B60G 17/018 | |
| 11,400,786 B2 * | 8/2022 | Brady | B60G 17/08 | |
| 11,400,787 B2 * | 8/2022 | Brady | B60G 17/0164 | |
| 11,479,075 B2 * | 10/2022 | Graus | B60G 17/08 | |
| 11,529,836 B1 * | 12/2022 | Schubart | B60G 13/08 | |
| 11,549,565 B2 * | 1/2023 | Ericksen | B60G 17/01908 | |
| 11,584,185 B1 * | 2/2023 | Schubart | B60G 21/073 | |
| 11,660,924 B2 * | 5/2023 | Ericksen | F16F 9/5126 | 701/37 |
| 11,685,220 B2 * | 6/2023 | Calchand | B60G 11/265 | 280/5.515 |
| 11,691,474 B2 * | 7/2023 | Boon | B60G 21/067 | 141/1 |
| 11,697,319 B2 * | 7/2023 | Vandersmissen | B60G 17/056 | 280/5.514 |
| 11,794,543 B2 * | 10/2023 | Ericksen | F16F 9/5126 | |
| 2003/0204293 A1 * | 10/2003 | Shiino | B60G 17/0162 | 280/5.502 |
| 2004/0039506 A1 * | 2/2004 | Kim | B60G 17/0164 | 701/37 |
| 2007/0124051 A1 * | 5/2007 | Fujita | B60G 17/0162 | 701/70 |
| 2011/0035089 A1 * | 2/2011 | Hirao | B60G 17/06 | 701/31.4 |
| 2014/0125018 A1 * | 5/2014 | Brady | B60G 17/016 | 280/5.519 |
| 2014/0316652 A1 * | 10/2014 | Ericksen | F16F 9/512 | 701/37 |
| 2015/0057885 A1 * | 2/2015 | Brady | B60G 17/019 | 701/37 |
| 2015/0081171 A1 * | 3/2015 | Ericksen | B60G 17/08 | 701/37 |
| 2016/0059660 A1 * | 3/2016 | Brady | B60G 17/08 | 701/37 |
| 2017/0008363 A1 * | 1/2017 | Ericksen | B60G 17/018 | |
| 2017/0087950 A1 * | 3/2017 | Brady | B60G 17/018 | |
| 2018/0297435 A1 * | 10/2018 | Brady | B60G 17/0164 | |
| 2018/0326808 A1 * | 11/2018 | Ericksen | B60G 17/016 | |
| 2018/0334007 A1 * | 11/2018 | Ericksen | F16F 9/512 | |
| 2018/0334008 A1 * | 11/2018 | Ericksen | B60G 17/016 | |
| 2018/0339565 A1 * | 11/2018 | Ericksen | B60G 17/015 | |
| 2018/0339566 A1 * | 11/2018 | Ericksen | B60G 17/08 | |
| 2018/0339567 A1 * | 11/2018 | Ericksen | B60G 17/015 | |
| 2018/0355946 A1 * | 12/2018 | Ericksen | F16F 9/5126 | |
| 2019/0275853 A1 * | 9/2019 | Ericksen | F16F 9/512 | |
| 2019/0283519 A1 * | 9/2019 | Ericksen | F16F 9/512 | |
| 2020/0156430 A1 * | 5/2020 | Oakden-Graus | B60G 17/06 | |
| 2020/0292025 A1 * | 9/2020 | Ericksen | B60G 17/01908 | |
| 2021/0023900 A1 * | 1/2021 | Ericksen | F16F 9/512 | |
| 2021/0031582 A1 * | 2/2021 | Ericksen | F16F 9/5126 | |
| 2021/0039467 A1 * | 2/2021 | Ericksen | F16F 9/512 | |
| 2021/0039468 A1 * | 2/2021 | Ericksen | B60G 17/08 | |
| 2021/0070124 A1 * | 3/2021 | Brady | B60G 17/01908 | |
| 2021/0070125 A1 * | 3/2021 | Brady | B60G 17/0164 | |
| 2021/0070126 A1 * | 3/2021 | Brady | B60G 17/016 | |
| 2021/0086578 A1 * | 3/2021 | Brady | B60G 17/016 | |
| 2021/0162830 A1 * | 6/2021 | Graus | B60G 17/0164 | |
| 2021/0362806 A1 * | 11/2021 | Hedlund | B62M 27/02 | |
| 2022/0016949 A1 * | 1/2022 | Graus | B60G 17/01933 | |
| 2022/0105769 A1 * | 4/2022 | Chetty | B60G 17/0162 | |
| 2022/0161625 A1 * | 5/2022 | Ericksen | B60G 17/018 | |
| 2022/0324282 A1 * | 10/2022 | Brady | B60G 17/08 | |
| 2022/0388362 A1 * | 12/2022 | Graus | B60G 17/0164 | |
| 2023/0109741 A1 * | 4/2023 | Vandersmissen | B60G 13/08 | 280/124.161 |
| 2023/0110337 A1 * | 4/2023 | Calchand | B60G 17/0185 | 701/37 |
| 2023/0111355 A1 * | 4/2023 | Vandersmissen | G01M 13/003 | 701/37 |
| 2023/0111759 A1 * | 4/2023 | Vandersmissen | B60G 13/08 | 280/5.514 |
| 2023/0111977 A1 * | 4/2023 | Boon | B60G 17/01908 | 701/37 |
| 2023/0112405 A1 * | 4/2023 | Calchand | B60G 17/0152 | 280/5.515 |
| 2023/0113777 A1 * | 4/2023 | Vandersmissen | B60G 21/073 | 701/37 |
| 2023/0113819 A1 * | 4/2023 | Vandersmissen | B60G 21/067 | 280/5.507 |
| 2023/0113913 A1 * | 4/2023 | Calchand | B60G 17/0185 | 701/37 |
| 2023/0114717 A1 * | 4/2023 | Boon | B60G 17/0152 | 701/37 |
| 2023/0115190 A1 * | 4/2023 | Boon | B60G 17/0164 | 141/1 |
| 2023/0115594 A1 * | 4/2023 | Calchand | B60G 21/073 | 701/37 |
| 2023/0131078 A1 * | 4/2023 | Ericksen | B60G 17/016 | 701/37 |
| 2023/0364958 A1 * | 11/2023 | Gerlach | B60G 17/0164 | |

FOREIGN PATENT DOCUMENTS

| | | | | |
|---|---|---|---|---|
| CA | 3119941 A1 * | 5/2020 | | B60G 17/0162 |
| CA | 3173047 A1 * | 11/2021 | | B60G 17/015 |
| CA | 2890996 C * | 3/2023 | | B60G 17/016 |
| CN | 1485224 A * | 3/2004 | | B60G 17/0164 |
| CN | 1276842 C * | 9/2006 | | B60G 17/0164 |
| CN | 110121438 A * | 8/2019 | | B60G 17/0162 |
| CN | 111703267 A * | 9/2020 | | B60G 17/016 |
| CN | 113165466 A * | 7/2021 | | B60G 17/0162 |
| CN | 110121438 B * | 1/2023 | | B60G 17/0162 |
| CN | 116568533 A * | 8/2023 | | B60G 15/06 |
| CN | 117048272 A * | 11/2023 | | B60G 17/0162 |
| CN | 117227382 A * | 12/2023 | | |
| DE | 19815859 A1 * | 10/1998 | | B60G 17/015 |
| DE | 102010018563 B4 * | 5/2022 | | B60G 17/015 |
| DE | 102023111640 A1 * | 11/2023 | | B60G 17/0162 |
| EP | 1391332 A2 * | 2/2004 | | B60G 17/0164 |
| EP | 1930233 B1 * | 8/2015 | | B60G 17/0164 |
| EP | 2939857 A2 * | 11/2015 | | B60G 17/0152 |
| EP | 2917054 B1 * | 9/2018 | | B60G 17/016 |
| EP | 3626485 A1 * | 3/2020 | | B60G 11/265 |
| EP | 3341247 B1 * | 11/2020 | | B60G 17/0155 |
| EP | 2939857 B1 * | 6/2021 | | B60G 17/0152 |
| EP | 3929008 A1 * | 12/2021 | | B60G 17/0152 |
| GB | 2233939 A * | 1/1991 | | B60G 17/0162 |
| JP | 2003011634 A * | 1/2003 | | B60G 17/018 |
| JP | 2003011635 A * | 1/2003 | | |
| JP | 2004075066 A * | 3/2004 | | B60G 17/0164 |

(56) References Cited

FOREIGN PATENT DOCUMENTS

| JP | 2008238948 A | * | 10/2008 | |
|---|---|---|---|---|
| JP | 2010215153 A | * | 9/2010 | |
| JP | 4596112 B2 | * | 12/2010 | |
| JP | 4674882 B2 | * | 4/2011 | ............. B60G 21/06 |
| JP | 4716071 B2 | * | 7/2011 | ........... B60G 17/018 |
| JP | 5416442 B2 | * | 2/2014 | |
| WO | WO-2016057555 A1 | * | 4/2016 | ........... B60G 17/016 |
| WO | WO-2020150522 A1 | * | 7/2020 | ........ B60G 17/0162 |
| WO | WO-2022016155 A1 | * | 1/2022 | ............. B60G 15/06 |

* cited by examiner

SUSPENSION SYSTEM WITH DYNAMIC WEIGHT BALANCING CONTROL

TECHNICAL FIELD

Example embodiments generally relate to vehicle suspension and, more particularly, relate to an electronically controlled suspension system that is capable of dynamically adjusting weight balance while turning.

BACKGROUND

Vehicles commonly employ either solid axle suspension or independent suspension that allows each wheel to move relative to the vehicle chassis independent of the other wheels. The components and geometries used for both types of suspension designs can vary to some degree. However, a typical independent suspension system will employ shock absorbers (or simply "shocks") that are designed to provide damping for heave (i.e. oscillation along the vertical axis of the vehicle) pitch (i.e., oscillation about a lateral axis of the vehicle), roll (i.e., oscillation about a longitudinal axis of the vehicle) and individual wheel disturbances that may be encountered. The shocks generally resist compression and rebound with damping forces that are applied over a range of travel and velocity of a piston rod.

The shocks selected for a particular vehicle are generally chosen based on the expectation of normal pitch, roll and individual wheel event scenarios that are encountered during routine driving conditions. In the past, once the suspension components and shocks of a vehicle were selected, the response to wheel event scenarios was predetermined. More recently, semi-active suspensions have been developed to be able to vary the amount of damping force applied by shocks, and drivers could, for example, select a mode of driving, and have the damping adjusted accordingly to support the selected mode. However, even this level of adaptability does not generally provide the ability to add force or subtract force in strategic and dynamic ways. Instead, such changes are generally applicable to the whole vehicle during operation in the selected mode, and are not targeted to dealing with dynamic situations such as cornering or turning including doing so while changing speed. Thus, a more adaptive and capable design may be desired.

BRIEF SUMMARY OF SOME EXAMPLES

In accordance with an example embodiment, a vehicle suspension control system may be provided. The system may include a plurality of sensors that determine ride height information associated with individual wheels of a vehicle and vehicle attitude information, a plurality of adjustable dampers associated with respective ones of the individual wheels of the vehicle, and a controller that generates a first damping intervention signal to change a damping force applied by a first selected adjustable damper responsive to detection of a trigger event associated with the ride height information and the vehicle attitude information. The first selected adjustable damper may be associated with only one of a pair of rear wheels of the vehicle.

In another example embodiment, a method of automatically applying damping force interventions for dynamic weight balancing in a suspension system of a vehicle may be provided. The method may include receiving ride height information associated with respective individual wheels of the vehicle and vehicle attitude information from vehicle sensors, determining, based on the ride height information and the vehicle attitude information, whether a trigger event has occurred, and generating a first damping intervention signal to change a damping force applied by a first selected adjustable damper responsive to determining that the trigger event has occurred. The first selected damper may be one of a plurality of adjustable dampers associated with respective ones of the individual wheels of the vehicle. The first selected adjustable damper may be associated with only one of a pair of rear wheels of the vehicle.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
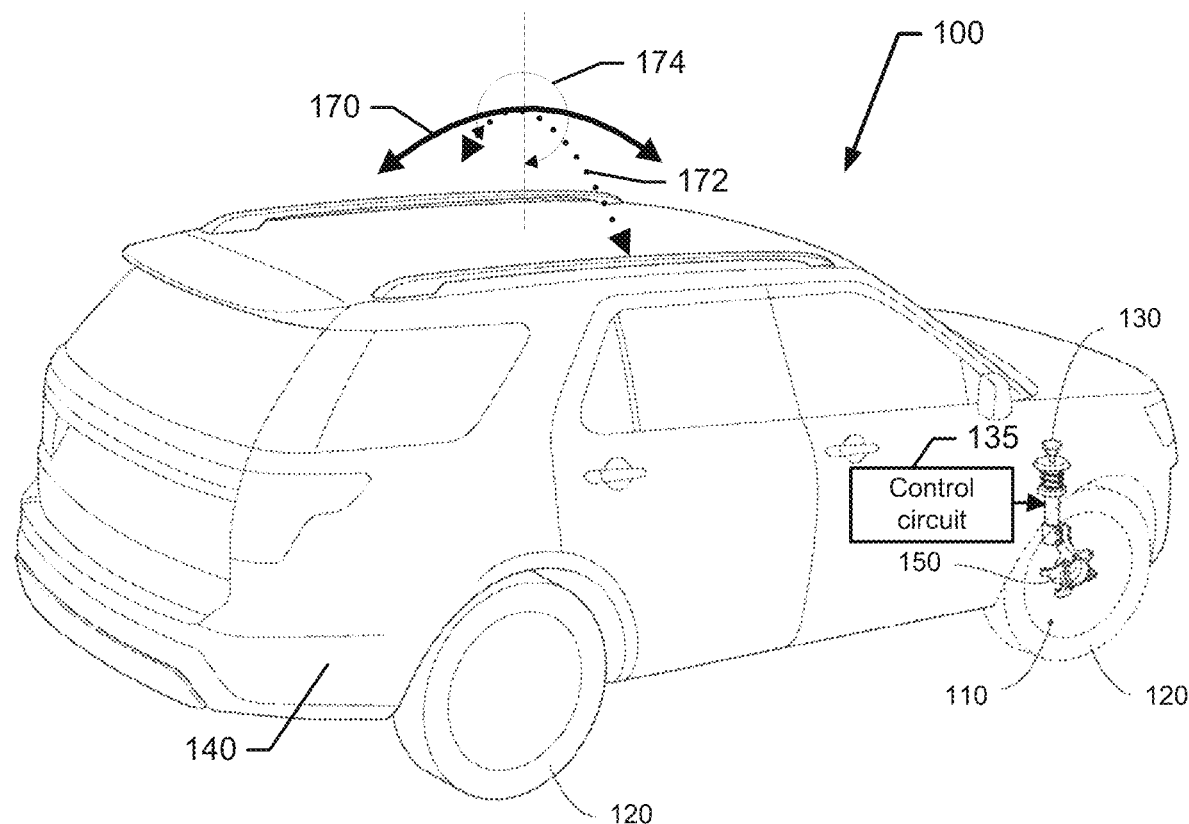
FIG. 1 illustrates a perspective view of a vehicle capable of adjusting damping forces in its suspension system in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein may address the problems described above. For example, some embodiments may provide a suspension system that employs convertible (or adaptive) suspension components that can instantaneously transfer vehicle weight during turning or cornering, or more specifically when accelerating while cornering in some cases. In this regard, when a vehicle is exiting a corner, the vehicle attitude is a combination of forward pitch and outward roll due to the deceleration and turn application on the entry and middle of the corner. Large corner weights exist on the outside tires, during this transient condition as weight shifts outwardly, and the largest weight is generally felt at the outside front tire. Meanwhile, the weight transfer leaves relatively little weight remaining on the inside rear tire thereby limiting the vehicle's tractive capability while in the forward pitch and outward roll position.

Example embodiments enable dynamic control of a convertible or adaptive suspension component, namely an adaptive damper, to dynamically adjust the normal weight transfer phenomenon described above during cornering. For example, the adaptive damper may be adjusted to create a very stiff load path that facilitates weight transfer toward the inside wheels generally, and toward the inside rear wheel more specifically, in order to balance the vertical load across both rear tires and thus increase the rear axle capability to provide forward traction.

In some example embodiments, dynamically adjusting compression damping to the adaptive damper alone may upgrade vehicle performance during cornering. For example, the inside rear damper during a given turn may be electronically adjusted to increases stiffness in the compression direction to create a stiffer load path for diagonal weight transfer to push the inside rear tire more firmly onto the road surface, thereby generating and increase in tractive capacity of the rear axle. However, if dynamic adjustment of both compression damping and rebound damping is possible in a given vehicle suspension system, then even further adaptability and further control over weight balance considerations during cornering may be possible. For example, while the compression damping is adjusted as described above for the inside rear damper, the diagonal front damper (i.e., the outside front damper) may also be electrictronically adjusted to deliver a decrease in rebound damping in order to generate additional transient weight transfer to the inside rear wheel.

In an example embodiment, through utilization of individual ride height sensors to determine damper position and vehicle warp (i.e., pitch and roll combination of motion) along with other basic measured parameters (e.g., lateral and longitudinal acceleration and yaw), an electronic control unit (ECU) or other processing circuitry onboard may determine vehicle attitude during a turn and adjust compression damping to the inside rear damper while providing complementary rebound damping adjustment to the outside front damper to promote an increase in tire loading for the inside rear tire. Moreover, such adjustment may be strategically applied at a particular moment within the turn. For example, a determination may be made as to when the vehicle is accelerating out of the turn, and the modifications described above may be triggered once such acceleration is detected. Thus, a dynamic weight balance may be achieved to balance the load across the rear tires more evenly coming out of a turn thereby also increasing the overall net rear axle grip coming out of the turn.

FIG. 1A illustrates a perspective view of a vehicle 100 employing a suspension system 110 of an example embodiment. The suspension system 110 includes a plurality of wheels 120 in contact with the ground, and a convertible or adjustable suspension damper 130 (e.g., a damper, shock absorber or shock that has dynamically adjustable compression or rebound damping) disposed between each one of the wheels 120 and a body 140 or chassis of the vehicle 100. The adjustable suspension damper 130 may be operably coupled to a control circuit 135 that is operable to change the amount of damping force applied in the adjustable suspension damper 130 as described in greater detail below. In some cases, the wheel 120 may be operably coupled to the adjustable suspension damper 130 via a steering knuckle 150. Additional links may also be provided between the chassis and the steering knuckle 150 to stabilize the wheel 120, but such links are outside the scope of example embodiments.

As shown in FIG. 1, the body 140 of the vehicle 100 may tend to move up and down and shift weight forward and rearward responsive to pitching as shown by double arrow 170. The body of the vehicle 100 may also shift weight right or left responsive to rolling as shown by double arrow 172. Combinations of forces on the body 140 of the vehicle 100 responsive to pitch and roll, and other more complex interactions, may result in yaw, which is pivoting about a vertical axis of the vehicle 100, as shown by double arrow 174. These forces are generally resisted by damping at each of the wheels 120 provided by shocks or other damping devices. To the extent the shocks or damping devices are designed to have static damping characteristics, the combinations of pitch, roll and yaw will cause corresponding weight shifts in the vehicle 100, which can affect the traction at each respective one of the wheels 120. As noted above, example embodiments may employ dynamic control of the adjustable suspension damper 130 in order to strategically modify or influence the weight balance to provide better traction in certain conditions such as, for example, during turning or cornering.

Figure 2A:
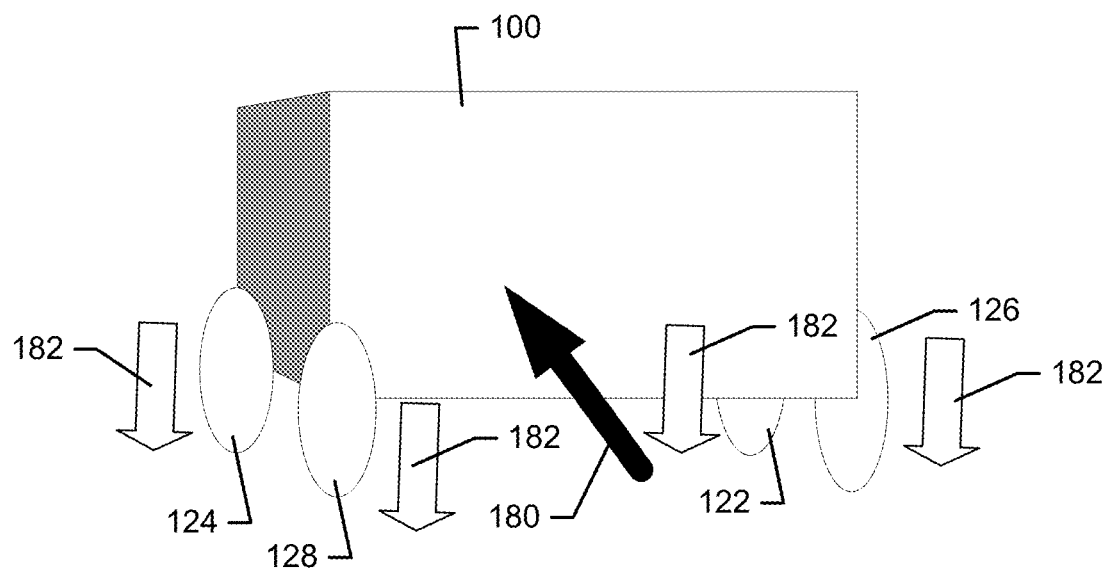
FIG. 2A shows weight balance on wheels of a vehicle during normal driving when the vehicle is not turning in accordance with an example embodiment.

FIG. 2A shows a schematic view of the vehicle 100 illustrating a weight balance applied to the wheels 120 (including front right wheel 122, front left wheel 124, rear right wheel 126 and rear left wheel 128) during straight ahead driving as indicated by arrow 180. Weight indication arrows 182 associated with this driving condition generally show a weight balance condition in which a relatively equal sharing of weight occurs across all of the wheels 120.

Figure 2B:
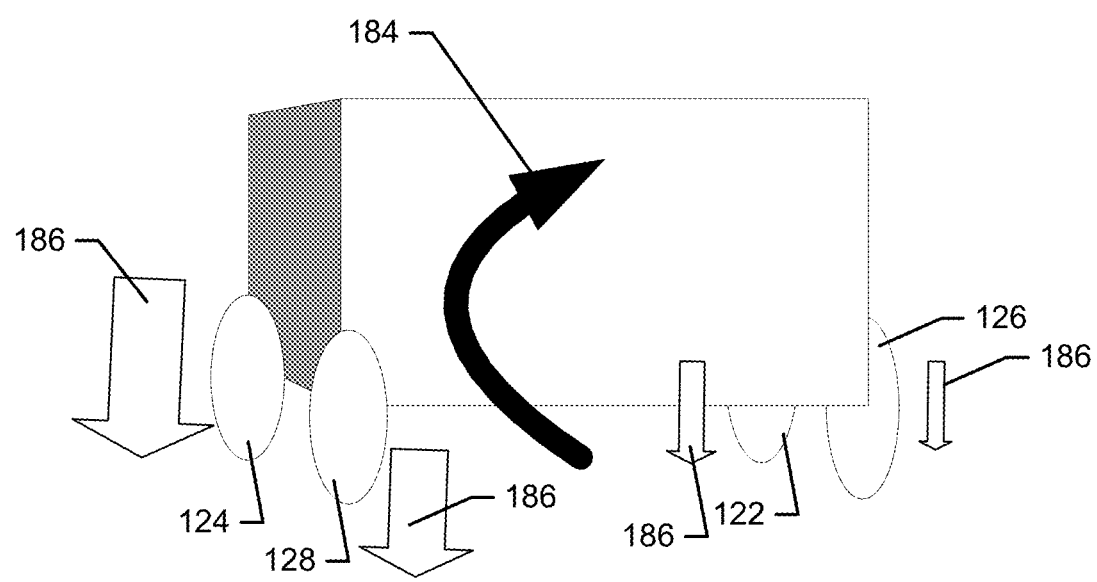
FIG. 2B shows weight balance during a turn without intervention from an example embodiment.

FIG. 2B shows a schematic view of the vehicle 100 illustrating a weight balance applied to the wheels 120 during a turn to the right as indicated by arrow 184. Weight indication arrows 186 associated with this driving condition generally show a weight balance condition in which a greater weight is being borne by wheels on the outside (or left side in this case) of the turn (e.g., left front wheel 124 and left rear wheel 128) than the weight being borne by wheels on the inside (or right side in this case) of the turn (e.g., right front wheel 122 and right rear wheel 126). More weight is also borne at the outside front (e.g., left front wheel 124) than at the outside rear (e.g., left rear wheel 128), and a least amount of weight is being borne at the inside rear (e.g., right rear wheel 126). Thus, there is no longer an equal weight distribution on all of the wheels 120, and the wheels 120 will each therefore have potentially different tractive contact with the road surface.

Figure 2C:
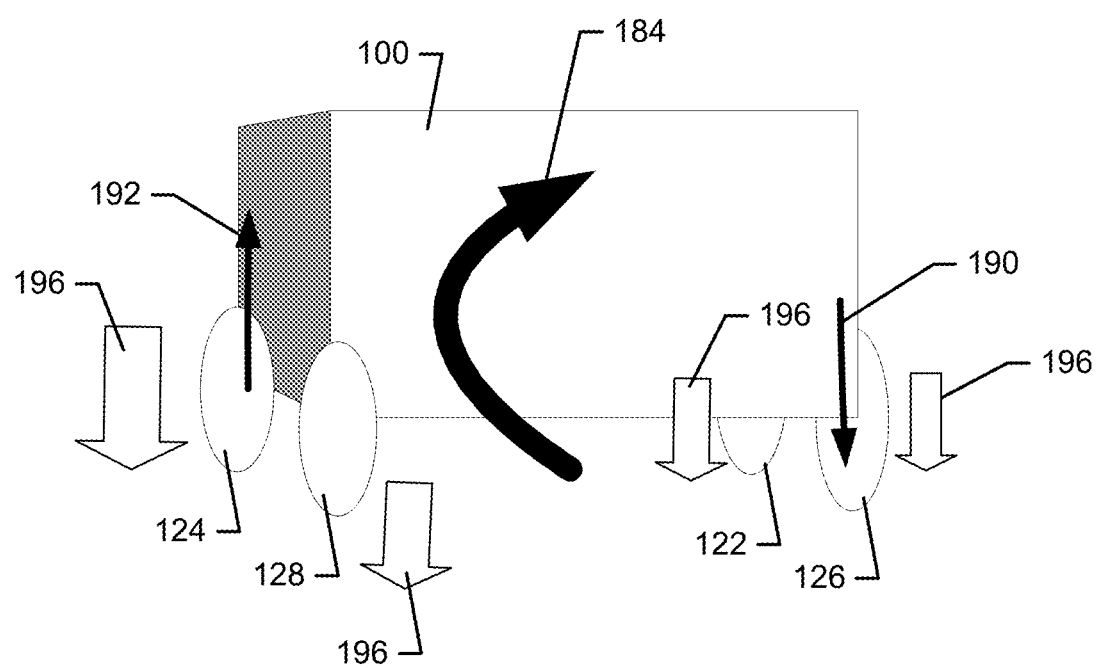
FIG. 2C shows weight balance during a turn with intervention from an example embodiment.

To counteract the situation shown in FIG. 2B, example embodiments may individually adjust damping force in the adjustable suspension damper 130 at one or more of the wheels 120 as shown in FIG. 2C. In particular, as will be discussed in greater detail below, an increased compression damping force (indicated by arrow 190) may be applied at the inside rear wheel (i.e., right rear wheel 126). In some cases, a complementary decrease in rebound damping (as shown by arrow 192) may be applied at the outside front wheel (i.e., the left front wheel 124) to generate additional transient weight transfer to the inside rear wheel. Modifications to the weight balance condition are shown by weight indication arrows 196 in FIG. 2C, and it can be seen that more weight is applied to the right rear wheel 126 to upgrade its tractive contact with the road surface. Less weight is applied to the left front wheel 124 as a result of this weight transfer as well.

Figure 3:
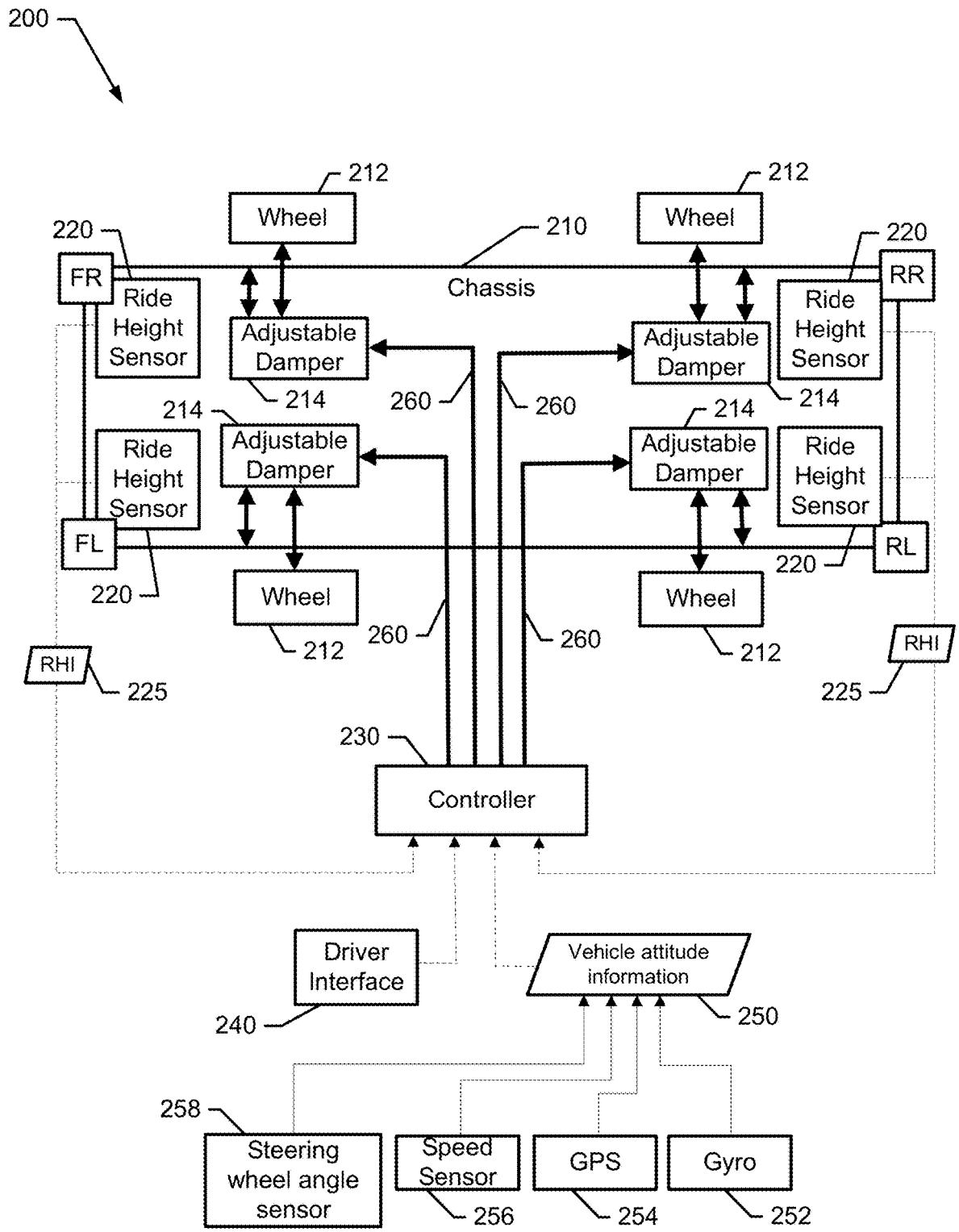
FIG. 3 illustrates a block diagram of a suspension control system in accordance with an example embodiment.

To upgrade suspension performance, and provide the type of dynamic control described above, example embodiments may employ a suspension control system 200. The suspension control system 200 may be configured to detect situations where adjustments to weight balance may be advantageous (e.g., when exiting a turn) and intelligently control damping force augmentation for better suspension performance. An example is shown in FIG. 3, which illustrates a block diagram of the suspension control system 200. As shown in FIG. 3, a vehicle chassis 210 may be provided with wheels 212. The wheels 212, and corresponding instances of an adjustable damper 214 for each respective one of the wheels 212 may form part of a suspension system of the vehicle on which the suspension control system 200 is deployed.

In an example embodiment, the suspension control system 200 may include a ride height sensor 220 associated with each wheel 212 and each respective adjustable damper 214. In this regard, an instance of the ride height sensor 220 may be provided in or near each corner of the chassis 210 (e.g., front-right (FR), front-left (FL), rear-right (RR) and rear-left (RL)). The ride height sensors 220 may be configured to determine a height of the chassis 210 (or another reference point on the vehicle) relative to the ground or a reference location that is generally assumed to correspond to the ground. The ride height sensors 220 may be embodied in any of a number of different ways including via analog impedance sensors or the use of lasers or other optical sensing means. However, any suitable ride height sensor could be employed.

The ride height sensors 220 may be operably coupled to a controller 230, which may be an electronic control unit (ECU) of the vehicle, or a separate instance of processing circuitry comprising a processor and memory. The controller 230 may be configured (e.g., via hardware, software or a combination of hardware and software configuration or programming) to receive ride height information (RHI) 225 from the ride height sensors 220 (and sometimes also from other components) and strategically apply damping adjustments to individual ones of the adjustable dampers 214 as described in greater detail below. Thus, it should be appreciated that the ride height information (RHI) 225 may be specific to each respective one of the wheels 212.

In an example embodiment, the controller 230 may also be operably coupled to a user interface (e.g., driver interface 240), and may receive vehicle attitude information 250 (e.g., inclination of the three principal axes of a the vehicle relative to a horizontal surface). The vehicle attitude information 250 may include, for example, latitudinal acceleration, longitudinal acceleration and yaw. In some embodiments, latitudinal and longitudinal acceleration, and yaw, may be determined from a gyro 252, a global position system (GPS) receiver 254, a speed sensor 256 and/or any other suitable device that may be part of an onboard suite of sensors of the vehicle. In some cases, speed may be determined for each individual one of the wheels 212 and comparisons may be made to vehicle speed and/or each other to determine wheel slip. In other cases, wheel angle (e.g., steering wheel angle) may be determined by a steering wheel angle sensor 258. The wheel angle may be informative for determining when a turn is being entered, when the vehicle is in the middle of the turn, and when the vehicle is accelerating out of the turn. The wheel angle may enhance the accuracy of such determinations that may be made without wheel angle information using, for example, just ride height information (RHI) 225, latitudinal and longitudinal acceleration, and yaw. Thus, the wheel angle and wheel slip may augment the vehicle attitude information 250 described above in some cases. Accordingly, for example, the timing of initiation of the detection of a trigger event may be finely tuned using any or all of the parameters listed above, and perhaps others as well.

In an example embodiment, the controller 230 may be configured to generate damping intervention signals 260 to change the damping characteristics of individual ones of the adjustable dampers 214 during changes in vehicle attitude that are sufficient to trigger operation of the controller 230. The damping intervention signals 260 may be generated based on the vehicle attitude information 250 and the ride height information (RHI) 225 generated by the ride height sensors 220 responsive to such information being used by the controller 230 to detect (and in some cases also classify or characterize) a trigger event. The trigger event may, in some cases, be a turning operation of the vehicle or, more specifically, a detection of acceleration of the vehicle while coming out of a turn.

Although not required, in some examples, the interventions generated by the controller 230 may be generated in a particular, driver-selected operational mode. Thus, for example, the driver interface 240 may be used by the driver to enter a mode in which the controller 230 is enabled to detect trigger events, and further enabled to generate the damping intervention signals 260 responsive to detection of the trigger event. In some cases, the driver interface 240 may be provided at the steering wheel, dashboard, center console, armrest or any other console or location conveniently accessible to the driver. The driver interface 240 may include a button, switch, lever, key (soft or hard) or other operable member that can be actuated to activate the controller 240 into the driver-selected operational mode in which damping intervention signals 260 are generated. When the driver-selected operational mode is activated, the controller 230 may be enabled to automatically monitor conditions to determine whether (and when) to apply the damping intervention signals 260 as described herein. However, as an alternative, the controller 230 may be configured to generate the damping intervention signals 260 without selection or knowledge of the driver. In other words, the controller 230 may be configured to run autonomously in the background in some cases, and wait for detection of the trigger event. Then upon detection of the trigger event, the controller 230 may determine which one or more of the wheels 212 should have its corresponding adjustable damper 214 adjusted via sending the damping intervention signal 260 thereto.

In an example embodiment, the controller 230 may operate to generate the damping intervention signals 260 responsive to one or more triggers or initiating events that only occur periodically based on the driving surface or situation. Although many different triggers or initiating events could activate the controller 230 to cause the damping intervention signals 260 to be generated, some example embodiments may provide that at least one such trigger or initiating event is receipt of ride height information 225 and/or vehicle attitude information 250 indicating that the vehicle is beginning to accelerate while exiting a turn. Thus, the controller 230 may be configured to detect a general event (such as a turn) and to detect situations that occur within or as part of the general event (e.g., a particular location in or portion of a turn, such as the exit) to detect conditions for which adaptive damping may be useful. Whether responding to a general event or a specific situation within a larger event, the controller 230 may generate the damping intervention signals 260 to alter the damping characteristics of the adjustable damper 214 to upgrade the ability of the vehicle to traverse a turn with better weight balance to provide a superior driving experience, and maintain contact of the wheels 212 with the terrain.

In an example embodiment, the controller 230 may be configured to execute a damper control algorithm stored at or accessible to the controller 230. In this regard, for example, the controller 230 may be configured to receive the ride height information 225 from each of the ride height sensors 220 along with vehicle attitude information 250 and execute the damper control algorithm based on such information. The damper control algorithm may configure the controller 230 to determine whether and when to apply the damping intervention signals 260 (on a wheel-by-wheel basis). In other words, the damper control algorithm may include programming for determining, in real time or near real time, the conditions at each respective one of the wheels 212 in the context of the overall situation of the vehicle, and provide damper control inputs in the form of damping intervention signals 260 to the individual respective ones of the wheels 212 in order to provide better weight balance during a turn. As such, the damping intervention signals 260 provided by the controller 230 may indicate which individual one of the wheels 212 is to have modified damping forces applied thereto by the respective instance of the adjustable damper 214 that correspond to the individual one of the wheels 212. Moreover, in some cases more than one of these individual controls for the wheels 212 may be received simultaneously and thereafter none, the same, or different controls may be prescribed for each of the wheels 212.

Figure 4A:
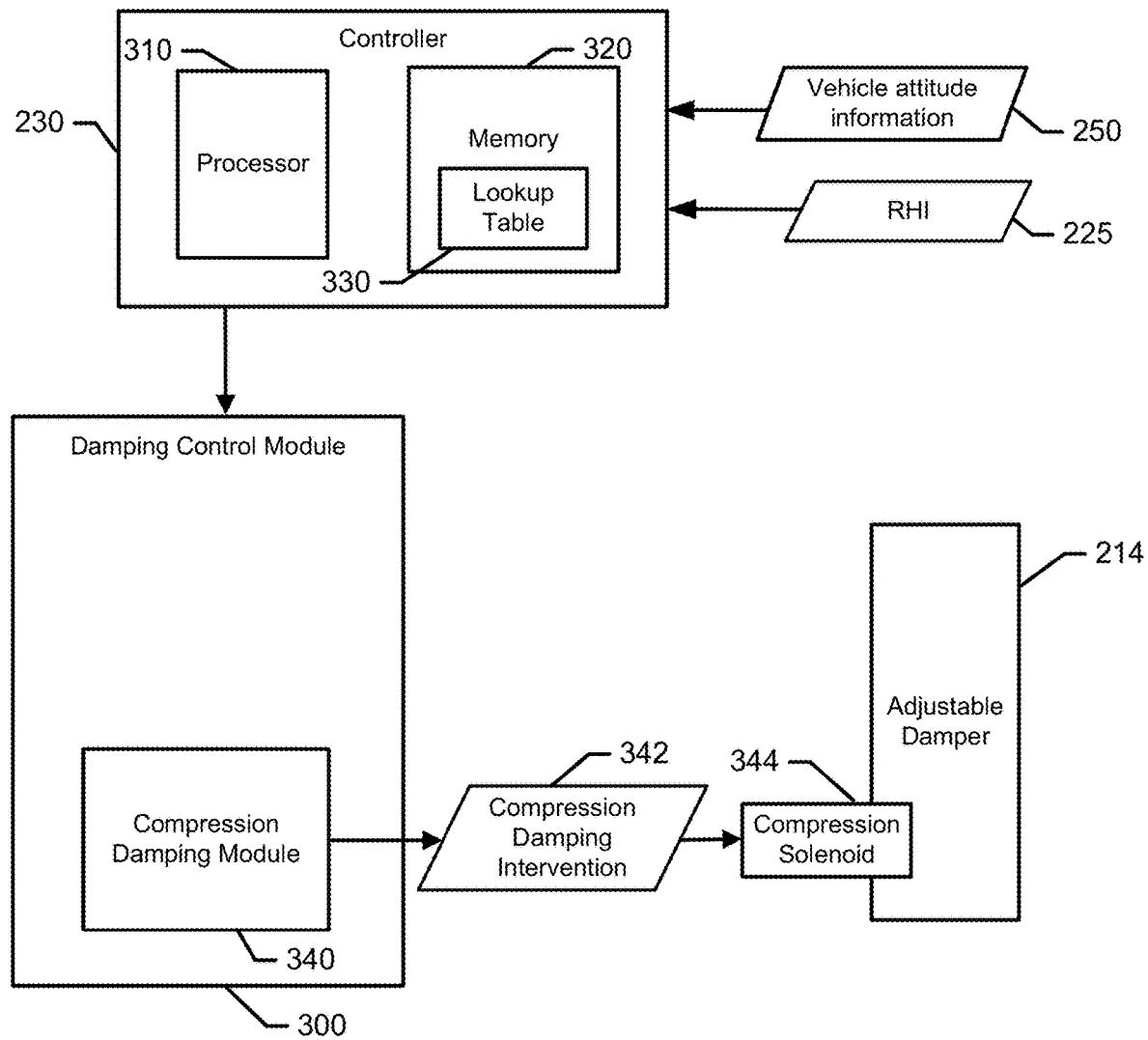
FIG. 4A illustrates a block diagram of components associated with adjustable damping control of only compression damping in accordance with an example embodiment.
Figure 4B:
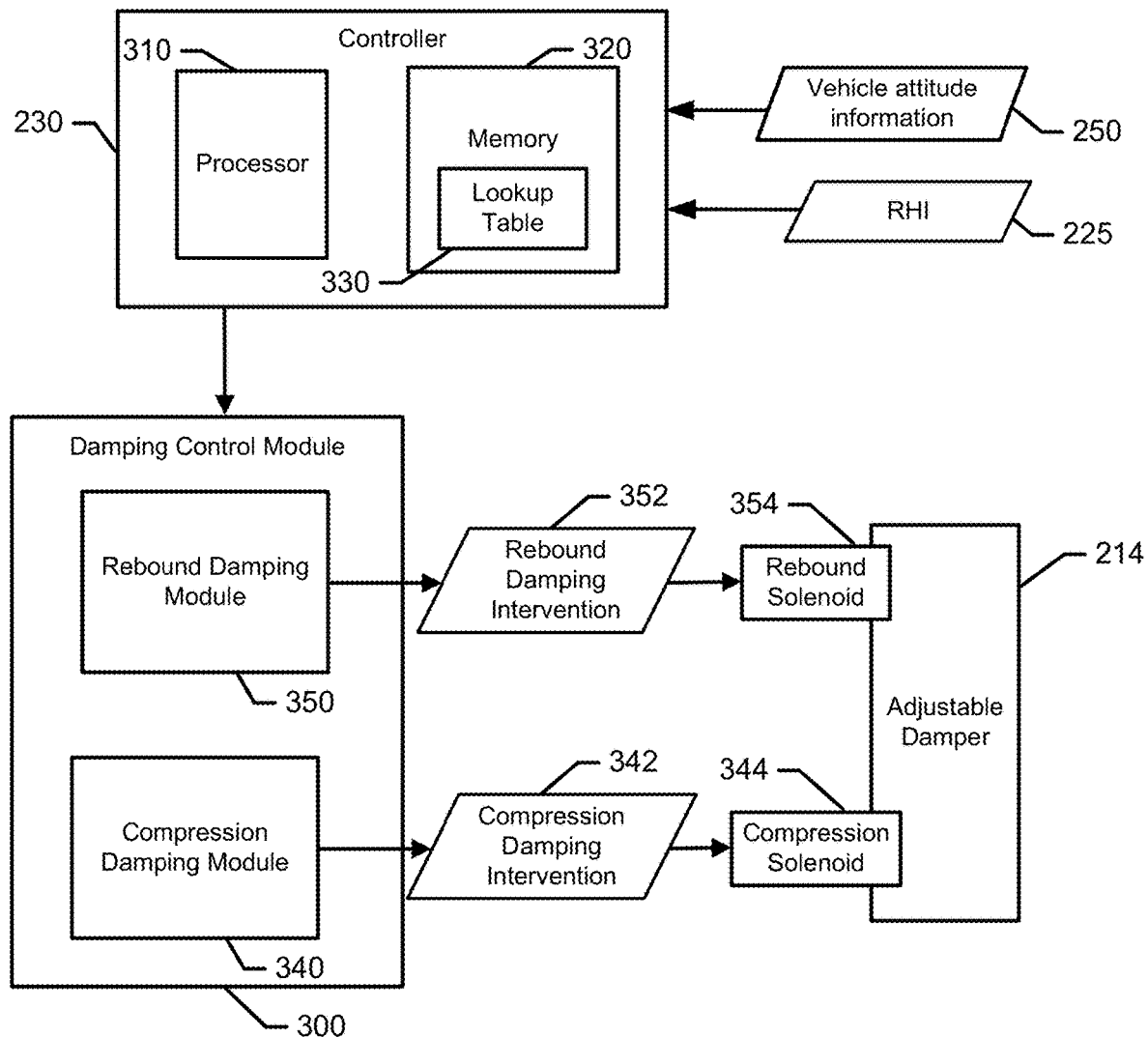
FIG. 4B illustrates a block diagram of components associated with adjustable damping control of both compression damping and rebound damping in accordance with an example embodiment.

Referring now to FIGS. 4A and 4B, operation of the controller 230 and the interactions the controller 230 has with the adjustable damper 214 (or at least one instance thereof) will be described in greater detail. As such, FIGS. 4A and 4B each illustrate a block diagram of various components of the suspension control system 200 in greater detail. In this regard, for example, FIGS. 4A and 4B illustrate example interactions between the controller 230 and a damping control module 300, which may be instantiated at the controller 230 to generate the damping intervention signals 260. As such, for example, the damping control module 300 may be a portion of the controller 230 that is programmed or otherwise configured to generate the damping intervention signals 260 under the control of the controller 230 (e.g., based on the execution of one or more control algorithms). Processing circuitry (e.g., a processor 310 and memory 320) at the controller 230 may process the information received (e.g., vehicle attitude information 250 and ride height information 225) by running one or more control algorithms that cause the functioning of the damping control module 300. The control algorithms may include instructions that can be stored by the memory 320 for retrieval and execution by the processor 310. In some cases, the memory 320 may further store one or more tables (e.g., look up tables 330) and various calculations and/or applications may be executed using information in the tables and/or the information as described herein.

The processor 310 may be configured to execute the control algorithms in series or in parallel. However, in an example embodiment, the processor 310 may be configured to execute multiple control algorithms in parallel (e.g., simultaneously) and substantially in real time. The control algorithms may be configured to perform various calculations based on the information received/generated regarding specific conditions of vehicle components, and particularly conditions related to detecting trigger events. The control algorithms may therefore execute various functions based on the information received, and generate outputs to drive the control of the damping intervention signals 260 applied to the adjustable dampers 214 associated with each of the wheels 212 of the vehicle.

The damping control module 300 may itself be a control algorithm, or may include control algorithms in the form of functional modules (or sub-modules) configured to perform specific functions for which they are configured relating to control of the vehicle suspension in the manner described herein. Thus, for example, the controller 230 may actually function as the damping control module 300 responsive to executing the control algorithms. However, in other cases, the damping control module 300 may be a component or module of the controller 230, or an entirely separate component (e.g., possibly also including its own corresponding processing circuitry). Although not required to be separated, in some cases, the damping control module 300 may separately handle adjustments in compression damping and rebound damping with corresponding individual modules or sub-modules dedicated to each respective situation. Moreover, it should be appreciated that in some embodiments, the adjustable damper 214 may only be adjustable in terms of compression damping. Whereas, in other embodiments, the adjustable damper 214 may be adjustable both in terms of compression damping and rebound damping.

FIG. 4A illustrates an example in which only compression damping adjustment is possible. Thus, for example, the damping control module 300 may further include a compression damping control module 340 that issues compression damping interventions 342 to a compression solenoid 344 disposed at the adjustable damper 214, but no rebound damping adjustment may be possible. In such an example, as noted above, the adjustable damper 214 of the inside rear wheel (and in some cases only the adjustable damper 214 of the inside rear wheel) may receive the compression damping intervention 342 when a trigger event is detected. The trigger event may be determined from the vehicle attitude information 250 and ride height information 225 as a turn, a turn having at least a minimum amount of weight balance shift involved therein based on the magnitude of the turn and/or the speed at which the turn is entered, and/or a specific time or location within a turn. Regarding the latter of these options, the specific time or location within the turn may be, for example, the point at which the driver accelerates out of the turn.

The compression damping intervention signal 342 may, for example, cause actuation of the compression solenoid 344 to open a valve or port to allow additional fluid to be ported into a chamber of the adjustable damper 214 to increase the compression damping stiffness of the adjustable damper 214. Increasing the stiffness of the adjustable damper 214, particularly when the adjustable damper 214 is the adjustable damper 214 of the inside rear wheel will create a stiffer load path for weight transfer and thereby also increase tire loading on the inside rear wheel.

Although not required, particularly when rebound damping adjustment is also possible, it may be further desirable to provide complementary rebound damping to the diagonal front adjustable damper 214. In other words, it may be desirable to, simultaneously apply a decrease in rebound damping to the outside front wheel while the compression damping increase described above is being applied to the inside rear wheel. To facilitate this possibility, the damping control module 300 may also include a rebound damping control module 350 that issues rebound damping interventions 352 to a rebound solenoid 354 disposed at the adjustable damper 214, as shown in FIG. 4B. The rebound damping intervention 352 and the compression damping intervention 342 are each examples of the damping intervention signals 260 described above.

As noted above, the information upon which the control algorithms operate may include the ride height information 225 and vehicle attitude information 250 (which may be further augmented by wheel angle and wheel slip among other parameters, in some cases). These parameters may be monitored in order to determine not only when a trigger event has occurred, but possibly also when a trigger event is likely or possibly approaching. The awareness of an impending approach of a trigger event may enable a faster response to the trigger event itself when the trigger event occurs. Thus, for example, timing may be an important consideration for the controller 230 (or for the damping control module 300) in relation to generating of either or both of the compression damping interventions 342 and the rebound damping interventions 352. In this regard, for a trigger event such as the point of acceleration while exiting a turn, the ride height information 225 and vehicle attitude information 250 may initially be monitored to determine that a turn (or a turn of at least a given magnitude, or occurring) is in progress in order to prepare for detection of the point at which acceleration out of the turn occurs in order to trigger the actuation of either or both of the compression damping intervention 342 and the rebound damping intervention 352 promptly in response to the trigger event.

The lookup table 330 may, for example, include lateral and longitudinal acceleration values and ride height values for each of the wheels 212 that indicate a turn (or a turn of a given magnitude or at a minimum speed). The lookup table 330 may therefore be entered into with these parameters to determine when the trigger event has occurred, and also define a corresponding response in terms of the provision of the compression damping intervention 342 (and possibly also the rebound damping intervention 352), and timing of the same. For example, the longer the compression solenoid 344 remains closed, the more stiffness may be added to the adjustable damper 214 in the compression direction. However, the paradigm regarding operation of the compression solenoid 344 for increasing stiffness could be reversed or changed in other ways as well depending on the specific design options employed.

As noted above, the lookup table 330 could also include other information such as, for example, wheel angle, individual wheel speeds, wheel slip, etc., that may be used for further tuning and more precise control of the timing of various interventions. Thus, for example, the lookup table 330 may be entered based on the ride height information 225, vehicle attitude information 250, time information, wheel velocity and/or the like to determine whether and when to generate the damping intervention signals 260 (and for which wheel(s) 212). Various combinations of any of the parameters or values included in the lookup table 330 may be selectively employed based on the specific situation encountered to generate damping adjustment requests. Thus, for example, the lookup table 330 may list force values or damper settings in tabular form based on tables that include various ones of the values noted above to enter the table.

Figure 5:
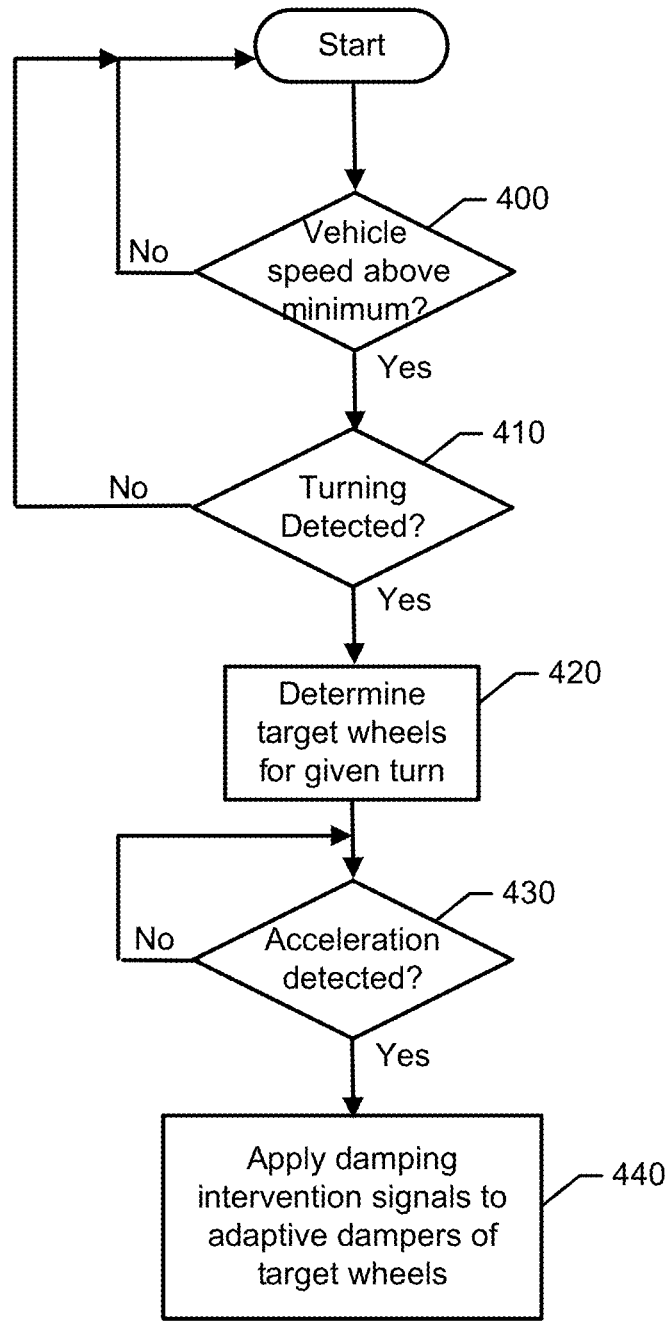
FIG. 5 illustrates a block diagram showing control flow of actions associated with the operation of the system of FIG. 3 in greater detail in accordance with an example embodiment.

FIG. 5 illustrates a block diagram of process flow associated with operation of the suspension control system 200 of FIG. 3 in accordance with an example embodiment. As shown in FIG. 5, an initial determination may, in some cases, be made as to the speed of the vehicle. In this regard, a determination as to whether the vehicle is above a minimum or threshold speed may be made at operation 400. This initial speed threshold may be made since, at very low speeds, a turn of nearly any magnitude may be made with relatively small changes in weight balance.

Thereafter, a determination may be made at operation 410 as to whether a turn is detected. The detection of a turn may be made based on steering wheel angle measurement, or based on the vehicle attitude information 250 and/or ride height information 225. While in the turn, it may also be determined as to which wheels of the vehicle will be the target wheels for the application of damping adjustment at operation 420. The occurrence of the trigger condition, which in this situation is acceleration out of the turn, may thereafter be determined at operation 430. Thus, for example, operations 400 and 410 may determine that the vehicle is involved in turning above a given speed as a precondition to detection of the trigger event, and operations 420 and 430 may combine to determine the target wheels and the trigger event itself. As such, the example of FIG. 5 breaks the general determination of a trigger event into a number of intermediate steps. However, it should be appreciated that this is just an example, and other examples may combine operations, or even change the order, and arrive similarly at the determination of a trigger event.

In this regard, for example, the suspension control system 200 may, in some cases, simply measure directly the vehicle attitude information 250 and/or ride height information 225 and determine, directly from such information, whether minimum threshold values for combinations of the parameters are met in order to determine that the trigger event (e.g., accelerating out of a turn) is occurring. In such an example, the lookup table 330 may effectively integrate the minimum turning speed and/or angles into the threshold values so that the trigger event cannot be detected unless sufficient speed and turning rates are being employed. Thus, while not separately determining a minimum speed or minimum turning angle, such values may nevertheless be present in order to exceed the threshold values for combinations of the parameters that indicate the trigger event.

Regardless of whether determining the trigger event is broken into multiple smaller operations or is simply one more or a few more complex operations, one the trigger event is detected (e.g., as a positive result of operation 430 in FIG. 5), damping intervention signals may then be applied to the adaptive dampers of the target wheel or wheels at operation 440. The target wheels include at least the inside rear wheel relative to the turn, to which compression damping adjustment is made to increase stiffness as noted above. Although not required, the target wheels may sometimes also include the outside front wheel, to which rebound damping adjustment may be made to decrease rebound damping in order to further facilitate transient weight transfer to the inside rear wheel.

The vehicle response that is calculated or determined at operation 440 may include any of the factors discussed above, and may be tuned over time. In other words, in addition to the programmed responses noted above, the controller 230 may also be capable of learning in real time and adapting the magnitude or timing of force instructions provided based on the results of previous operations. Factors that may be considered in relation to determining the vehicle response may include front and rear balance settings, vehicle speed sensitivity, and trigger determination criteria. In some embodiments, a force table (e.g., lookup table 330) may be plotted versus vehicle speed and turning rate. The force table may be modified based on adaptive learning to adjust for under-performance or over-performance as determined by performance criteria that may also be stored by the controller 230 for self-evaluation and learning-based modification of the force tables. Thus, the lookup table 330 may be programmed with initial values determined based on testing previously done. Thereafter, those initial values may be updated based on machine learning employed on data for an individual vehicle or based on aggregated data reported by many vehicles. In the individual vehicle case, each vehicle may employ independent machine learning to update its lookup table 330. In the aggregated case, lookup tables 330 for each vehicle may store and report data from various turns during which the damping adjustments are made to a central node, which may perform the machine learning. Updates to the lookup tables 330 of multiple vehicles may then be promulgated.

Figure 6:
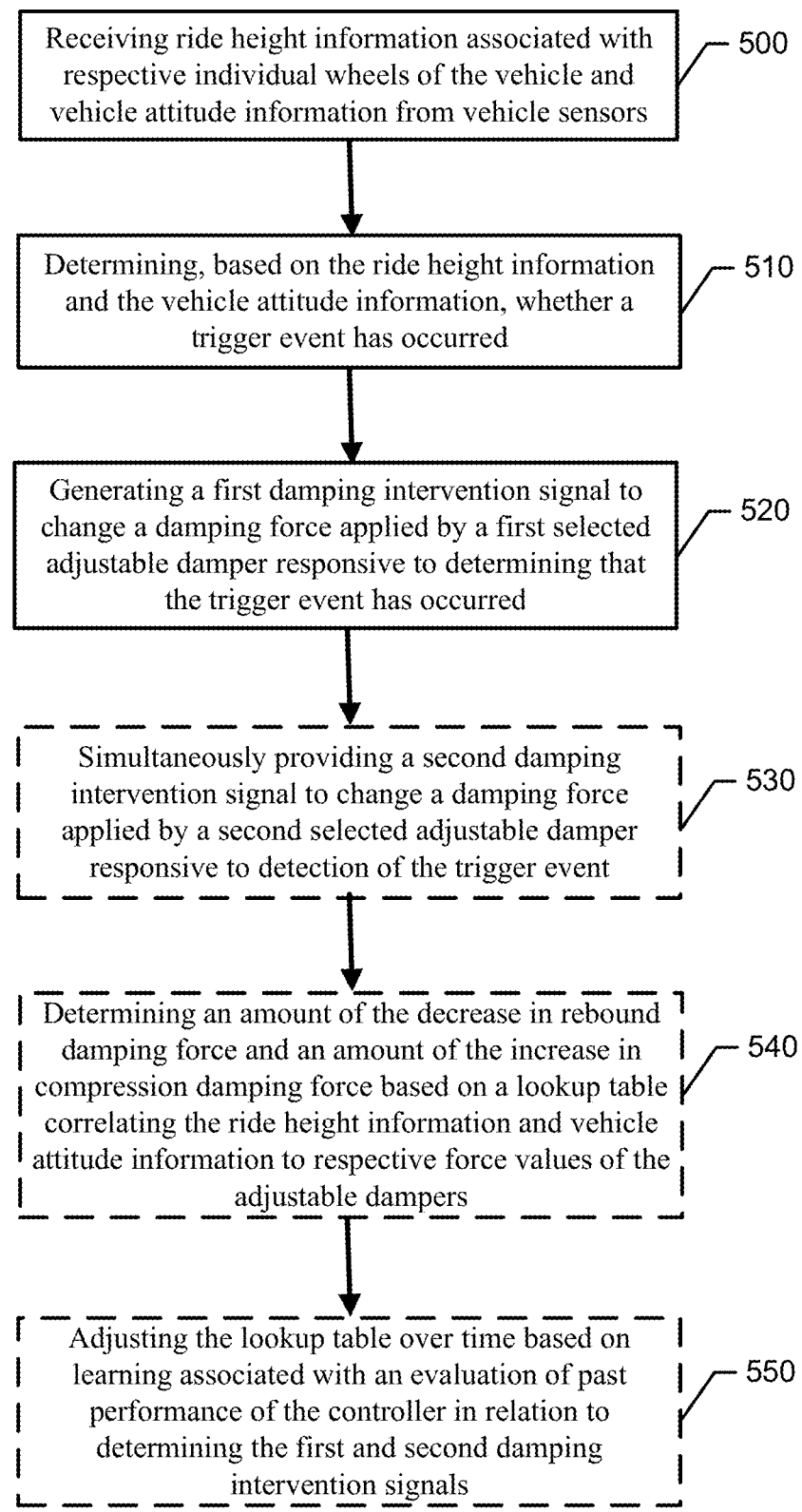
FIG. 6 is a block diagram of a method of providing dynamic weight balance for vehicle suspension according to an example embodiment.

In an example embodiment, a method of automatically applying damping force interventions for better weight balance in a suspension system of a vehicle may be provided. An example of such a method is shown in the block diagram of FIG. 6. In this regard, the method may include receiving ride height information associated with respective individual wheels of the vehicle and vehicle attitude information from vehicle sensors at operation 500, and determining, based on the ride height information and the vehicle attitude information, whether a trigger event has occurred at operation 510. The method may further include generating a first damping intervention signal to change a damping force applied by a first selected adjustable damper responsive to determining that the trigger event has occurred at operation 520. The first selected damper may be one of a plurality of adjustable dampers associated with respective ones of the individual wheels of the vehicle. The first selected adjustable damper may be associated with only one of a pair of rear wheels of the vehicle.

The method of some embodiments may include additional steps, modifications, augmentations and/or the like to achieve further objectives or enhance performance of the method. The additional steps, modifications, augmentations and/or the like may be added in any combination with each other. Below is a list of various additional steps, modifications, and augmentations that can each be added individually or in any combination with each other. For example, the method may further include simultaneously providing a second damping intervention signal to change a damping force applied by a second selected adjustable damper responsive to detection of the trigger event at operation 530. In some cases, the method may further include determining an amount of the decrease in rebound damping force and an amount of the increase in compression damping force based on a lookup table correlating the ride height information and vehicle attitude information to respective force values of the adjustable dampers at operation 540. In some embodiments, the method may further include adjusting the lookup table over time based on learning associated with an evaluation of past performance of the controller in relation to determining the first and second damping intervention signals at operation 550.

Example embodiments may provide better suspension performance while driving through turns by managing weight transfer to provide a higher level of comfort and a greater enjoyment in the feel of the ride. Example embodiments may also provide better rear axle grip under acceleration. In this regard, example embodiments may provide a vehicle suspension control system. The system may include a plurality of sensors that determine ride height information associated with individual wheels of a vehicle and vehicle attitude information, a plurality of adjustable dampers associated with respective ones of the individual wheels of the vehicle, and a controller that generates a first damping intervention signal to change a damping force applied by a first selected adjustable damper responsive to detection of a trigger event associated with the ride height information and the vehicle attitude information. The first selected adjustable damper may be associated with only one of a pair of rear wheels of the vehicle.

The system of some embodiments may include additional features, modifications, augmentations and/or the like to achieve further objectives or enhance performance of the system. The additional features, modifications, augmentations and/or the like may be added in any combination with each other. Below is a list of various additional features, modifications, and augmentations that can each be added individually or in any combination with each other. For example, the trigger event may be associated with a turn of the vehicle, and the first selected adjustable damper may be associated with an inside rear wheel of the vehicle. The first damping intervention signal may cause an increase in compression damping force of the first selected adjustable damper. In an example embodiment, the second selected adjustable damper may be associated with an outside front wheel of the vehicle, and the second damping intervention signal may cause a decrease in rebound damping force of the second selected adjustable damper. In some cases, the system may be enabled to perform all of the operations of the method described above in reference to FIG. 6. Moreover, the lookup table mentioned above may further include wheel angle, individual wheel velocity and wheel slip information. In an example embodiment, the trigger event may include detection of acceleration coming out of a turn. In some cases, the vehicle attitude information may include latitudinal acceleration of the vehicle, longitudinal acceleration of the vehicle, and yaw. In an example embodiment, changing the damping force applied by the first selected adjustable damper may adjust a suspension stiffness of a rear axle of the vehicle to provide better rear axle grip during acceleration out of a turn.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all That which is claimed:

1. A vehicle suspension control system comprising:
a plurality of sensors that determine ride height information associated with individual wheels of a vehicle and vehicle attitude information;
a plurality of adjustable dampers associated with respective ones of the individual wheels of the vehicle; and
a controller that generates a first damping intervention signal to change a damping force applied by a first selected adjustable damper responsive to detection of a trigger event associated with the ride height information and the vehicle attitude information,
wherein the first selected adjustable damper is associated with only one of a pair of rear wheels of the vehicle,
wherein the trigger event is associated with a turn of the vehicle,
wherein the first selected adjustable damper is associated with an inside rear wheel of the vehicle,
wherein the first damping intervention signal causes an increase in compression damping force of the first selected adjustable damper,
wherein the controller simultaneously provides a second damping intervention signal to change a damping force applied by a second selected adjustable damper responsive to detection of the trigger event,
wherein the second selected adjustable damper is associated with an outside front wheel of the vehicle, and
wherein the second damping intervention signal causes a decrease in rebound damping force of the second selected adjustable damper.

2. The system of claim 1, wherein the controller determines an amount of the decrease in rebound damping force and an amount of the increase in compression damping force based on a lookup table correlating the ride height information and vehicle attitude information to respective force values of the adjustable dampers.

3. The system of claim 2, wherein the lookup table further includes wheel angle, individual wheel velocity and wheel slip information.

4. The system of claim 1, wherein the trigger event comprises detection of acceleration coming out of a turn.

5. The system of claim 3, wherein the controller adjusts the lookup table over time based on learning associated with an evaluation of past performance of the controller in relation to determining the first and second damping intervention signals.

6. The system of claim 4, wherein the vehicle attitude information comprises latitudinal acceleration of the vehicle, longitudinal acceleration of the vehicle, and yaw.

7. The system of claim 1, wherein changing the damping force applied by the first selected adjustable damper adjusts a suspension stiffness of a rear axle of the vehicle to provide increased rear axle grip during acceleration out of a turn.

8. A method of automatically applying damping force interventions for dynamic weight balancing in a suspension system of a vehicle, the method comprising:
receiving ride height information associated with respective individual wheels of the vehicle and vehicle attitude information from vehicle sensors;
determining, based on the ride height information and the vehicle attitude information, whether a trigger event has occurred; and
generating a first damping intervention signal to change a damping force applied by a first selected adjustable damper responsive to determining that the trigger event has occurred, the first selected damper being one of a plurality of adjustable dampers associated with respective ones of the individual wheels of the vehicle,
wherein the first selected adjustable damper is associated with only one of a pair of rear wheels of the vehicle,
wherein the trigger event is associated with a turn of the vehicle,
wherein the first selected adjustable damper is associated with an inside rear wheel of the vehicle,
wherein the first damping intervention signal causes an increase in compression damping force of the first selected adjustable damper,
wherein the method further comprises simultaneously providing a second damping intervention signal to change a damping force applied by a second selected adjustable damper responsive to detection of the trigger event,
wherein the second selected adjustable damper is associated with an outside front wheel of the vehicle, and
wherein the second damping intervention signal causes a decrease in rebound damping force of the second selected adjustable damper.

9. The method of claim 8, further comprising determining an amount of the decrease in rebound damping force and an amount of the increase in compression damping force based on a lookup table correlating the ride height information and vehicle attitude information to respective force values of the adjustable dampers.

10. The method of claim 9, wherein the lookup table further includes wheel angle, individual wheel velocity and wheel slip information.

11. The method of claim 8, wherein the trigger event comprises detection of acceleration coming out of a turn.

12. The method of claim 10, further comprising adjusting the lookup table over time based on learning associated with an evaluation of past performance of the controller in relation to determining the first and second damping intervention signals.

13. The method of claim 11, wherein the vehicle attitude information comprises latitudinal acceleration of the vehicle, longitudinal acceleration of the vehicle, and yaw.

14. The method of claim 8, wherein changing the damping force applied by the first selected adjustable damper adjusts a suspension stiffness of a rear axle of the vehicle to provide increased rear axle grip during acceleration out of a turn.

* * * * *